United States Patent [19]  [11] 4,304,751
Li et al.  [45] Dec. 8, 1981

[54] PROCESS FOR SHAPING THERMOPLASTIC ARTICLES

[75] Inventors: Hsin L. Li, Parsippany; Thomas H. Golden, Denville, both of N.J.

[73] Assignee: Allied Corporation, Morris Township, Morris County, N.J.

[21] Appl. No.: 102,497

[22] Filed: Dec. 11, 1979

Related U.S. Application Data

[63] Continuation of Ser. No. 910,261, May 30, 1978, abandoned.

[51] Int. Cl.³ .............................................. B29C 1/04
[52] U.S. Cl. ................................... 264/322; 264/325; 264/DIG. 65; 264/338; 425/183; 425/193; 425/195
[58] Field of Search ............... 264/322, DIG. 65, 325, 264/338; 425/183, 193, 195

[56] References Cited

U.S. PATENT DOCUMENTS 2,452,761 11/1948 Josionowski ............... 264/DIG. 65
4,082,828 4/1978 Zulli ........................... 264/DIG. 65

Primary Examiner—Thomas P. Pavelko
Attorney, Agent, or Firm—Richard A. Negin; Patrick L. Henry

[57] ABSTRACT

A discrete thermoplastic composition is formed into a shaped article in a rapid stamping process. The composition is placed on and preheated with a rigid metal plate which has been preshaped to fit the contour of one of the dies of the stamping press. The heated composition and metal plate are then transferred to the stamping press where the composition is stamped and cooled into a three-dimensional shaped object. The surface of the metal plate contacting the composition has a special finish so that desired surface effects can be produced on the stamped article.

12 Claims, 6 Drawing Figures

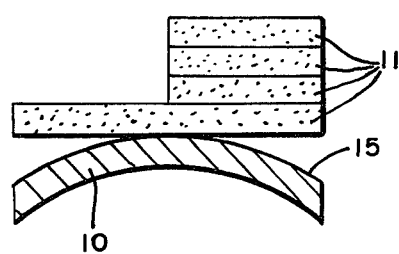
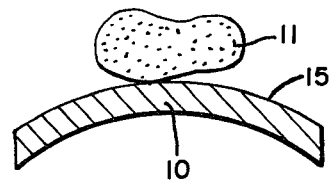
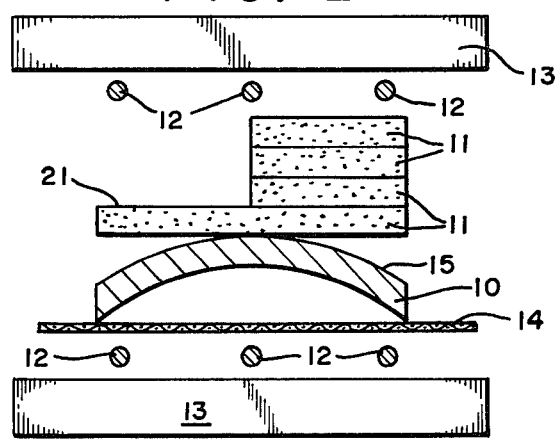
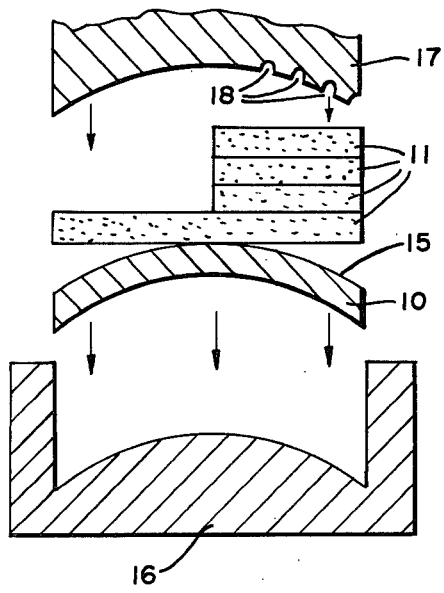
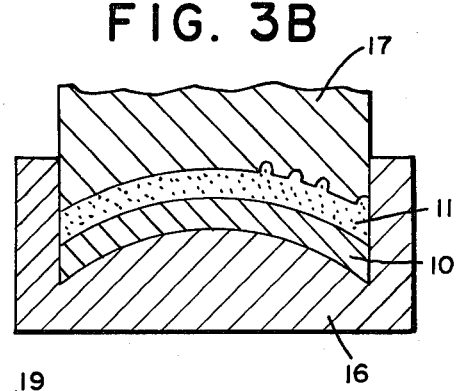
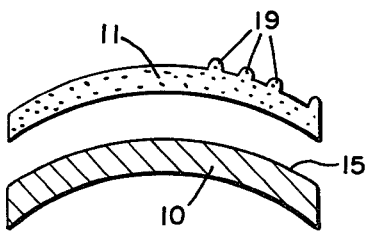

PROCESS FOR SHAPING THERMOPLASTIC ARTICLES

This is a continuation of application Ser. No. 910,261, filed May 30, 1978, now abandoned.

FIELD OF THE INVENTION

This invention relates to a process for shaping thermoplastic articles formed in a rapid stamping operation. More particularly, the invention relates to shaping a discrete thermoplastic composition wherein a rigid plate, which is preshaped to fit the contour of one of the dies of the stamping press, has a special finish on the surface which contacts the composition so that desired surface effects can be produced on the article to be stamped. The process also involves preheating the composition and plate prior to stamping in order to expedite a transfer of the heated composition to the stamping press and to facilitate production of the aforementioned surface effects.

DESCRIPTION OF THE PRIOR ART

The prior art is replete with methods for forming or shaping thermoplastic articles. One such method is the basic rapid stamping process which comprises the stages of: 1. preheat of the thermoplastic composition; 2. transfer to the rapid stamping press; 3. stamping under pressure; and 4. removal or ejection of the part from the press. An improvement in this method is disclosed by U.S. Ser. No. 861,487, filed Dec. 19, 1977, a continuation of U.S. Ser. No. 321,077, filed Jan. 4, 1973, now abandoned. The process of the application contemplates the improvement of placing the composition on a thin, flexible metal foil prior to preheating, the metal foil having a flexural modulus of less than $40 \times 10^6$ psi and a thickness less than 0.004 inch, and supporting the composition on the metal foil during the preheating and shaping cycle. The metal foil support facilitates support of the composition during the preheat and transfer stages of the process. The foil may optionally serve a purpose as an integral part of the end product, or it may be removed after stamping of the thermoplastic is completed, or it may be retained on the thermoplastic without serving any specific purpose.

The present invention comprises the same basic rapid stamping process but is directed toward control of the surface quality of the to-be-stamped article. Acceptable surface quality of the stamped product has been a primary objective in the development of stampable compositions. What is deemed an acceptable surface quality varies with the particular end use of the stamped product. For instance, a stamped automotive exterior or appearance part requires a surface which is sufficiently smooth, i.e., mirror finish, to permit immediate painting of the part without additional finishing. A rougher surface, however, may be acceptable where it is desired to stamp a part for decorative effect, e.g., with a woodgrain appearance or grille pattern. In fact, it may be preferable to stamp a part wherein the surface qualities of its several portions differ. It is, therefore, desirable to be able to control stamping conditions, as well as the components and construction of the thermoplastic composition, so as to rapidly produce stamped articles having a particular surface quality or qualities according to end use. Further, where stamped articles differ only in their respective surface qualities, it is desirable to stamp them utilizing the same basic equipment for reasons of economy.

Another method is disclosed in U.S. Pat. No. 2,673,371 to Uhlig. This patent teaches a method of shock cooling a hot molded thermoplastic article from its molding temperature to well below the transition temperature of the plastic, to maintain the major portion of the cooled plastic in an amorphous state. A hot mold has the face of each of its lower and upper sections covered with a preformed metal foil liner which is shaped to fit the contour of the mold cavity. Each foil liner has a thickness of between a few thousandths of an inch to about two or three hundredths of an inch. A charge of thermoplastic material is introduced into the mold between the foil liners, and the mold is closed under pressure so that its heat will soften the charge and render it plastic so as to conform under pressure to the lined mold cavity. The hot molded charge, while in a flaccid condition, and the foil liners are removed as a sandwich and plunged into a cooling bath to shock cool the molded plastic.

SUMMARY OF THE INVENTION

In accordance with the present invention, we have discovered a method which facilitates control of the surface quality of thermoplastic articles formed in a rapid stamping operation. The method also facilitates the transfer of the heated thermoplastic composition to the stamping apparatus. More specifically, in a method of processing thermoplastic compositions into shaped articles in which the composition is preheated, subsequently transferred to a set of dies and stamped into a three-dimensional shaped object in a rapid stamping cycle, we have discovered the improvement comprising:

a. placing the composition on a rigid plate, the surface of the plate contacting the composition having a special finish, the plate being preshaped to fit the contour of one of the dies;

b. preheating both the composition and the plate to a temperature greater than the melting temperature of the composition;

c. maintaining a set of dies at a temperature lower than the melting temperature of the composition;

d. transferring the composition and the plate to the set of dies, the plate being placed on the die to which it has been contoured;

e. pressing the composition and the plate between the set of dies until the plate has substantially cooled and until the composition maintains its integrity and will no longer warp; and f. removing the composition and the plate from the set of dies.

The thermoplastic composition may be in the form of sheets, logs, rope, cylinders, or spheres, or it may be irregularly shaped. The plate serves, in one capacity, as a support for the thermoplastic composition during the uniform preheat and transfer stages. Thus, during the preheat stage, clamps, grids, point supports or similar devices need contact only the plate, leaving the thermoplastic composition and its local flow characteristics undisturbed. During transfer, the heated thermoplastic composition and the plate are treated as a unit, contact by the transfer mechanism being only with the plate. Transfer may be accomplished by, for example, manual conveyance or by automated machinery. It is important during these two stages, however, to leave the composition-contacting surface of the plate undisturbed in the sense that the composition-contacting surface should not be handled or manipulated by anything which will distort its special finish, and thus affect the surface quality of the to-be-stamped product.

The preheating of the plate simultaneous with the preheating of the thermoplastic composition serves several other functions as well. Theoretically, the temperature of the dies should be as high as that to which the thermoplastic composition is preheated, i.e., to above the melting temperature of the thermoplastic composition, so as to initially facilitate the uniform flow of the thermoplastic composition during the stamping stage. This, in turn, would greatly enhance the quality of the article to be stamped. However, it is not practical to heat the dies to such a high temperature for several reasons. First, the mass of the dies relative to the article to be stamped is very large, which increases the energy output required. Second, and more important, is the increase in stamping cycle time necessitated by such excessive heating of the dies. The stamping stage of the process requires that pressure be applied to the thermoplastic composition between the set of dies until the thermoplastic composition will maintain its integrity and no longer warp, i.e., until the thermoplastic composition has cooled substantially below its melting temperature. Excessive heating of the dies prior to stamping will, therefore, increase the time required to cool the thermoplastic composition, cooling of the dies being mandated in order that the thermoplastic composition also be permitted to cool. By utilizing the plate, the dies do not need to be excessively heated, and, accordingly, the cycle time can be decreased from approximately two minutes to less than twenty seconds. Production is thus increased. The plate, then, functions during the stamping stage as a superheated die without any of the accompanying drawbacks or disadvantages. By preheating the plate simultaneously with the thermoplastic composition and by maintaining the special finish surface of the plate in contact with the thermoplastic composition, achievement of the special finish on the stamped article is enhanced due to the facilitation of flow of the thermoplastic composition in contact with what is, ultimately, a stamping surface. The plate, which is preshaped to the contour of one of the dies in the stamping press, cools by conduction from the die, which is at a lower temperature than the plate. The thermoplastic composition is correspondingly cooled by contact with the plate and the other, cool die.

The invention will be more clearly understood and additional objects and advantages will become apparent upon reference to the description below and to the drawings which are given for illustrative purpose.

BRIEF DESCRIPTION OF THE DRAWINGS

FIGS. 1A and 1B depict diagrammatically a thermoplastic composition supported on a rigid plate prior to preheating. FIG. 1A illustrates the sheet composition, and FIG. 1B illustrates an aggregate cake or particle form rather than sheet.

FIG. 2 illustrates a schematic cross-section of a thermoplastic composition supported on a rigid plate in an infrared oven.

FIG. 3A depicts a schematic cross-section of the preheated thermoplastic composition and rigid plate between the open dies of a stamping press, and FIG. 3B shows a view similar to FIG. 3A with the dies of the stamping press closed.

FIG. 4 is a cross-sectional view of the separated stamped article and rigid plate of FIG. 3B.

DESCRIPTION OF THE PREFERRED EMBODIMENT

The preferred embodiment of this invention provides an improvement to a method of processing thermoplastic compositions into shaped articles. The improvement comprises the steps of: (a) placing the composition on a plate, preferably metal, having a thickness ranging from 0.020 to 0.100 inch and a Young's modulus ranging from $10 \times 10^6$ to $60 \times 10^6$ psi, the surface of the metal plate contacting the composition having a special finish, the metal plate being preshaped to fit the contour of one of the dies in a set of dies for placement thereon during the stamping cycle; (b) subsequently preheating both the composition and the metal plate to a temperature greater than the melting temperature of the composition; (c) maintaining a set of dies at a temperature ranging between $-10°$ C. and a temperature which is $30°$ C. less than the melting temperature of the composition; (d) transferring the composition and the metal plate to the set of dies, the metal plate being placed on the die to which it has been contoured; (e) pressing the composition and the metal plate between the set of dies until the metal plate has substantially cooled and until the composition maintains its integrity and will no longer warp; (f) removing the composition and the metal plate from the set of dies; and (g) separating the composition and the metal plate from one another.

As stated previously, the plate of the preferred embodiment is made of metal. This is to ensure the thermal conductivity of the plate, which is preferably in the range of 8 to 240 BTU/hour (foot$^2$) (° F. per foot).

The thermoplastic composition may be in sheet, bulk, pellet, or aggregate form for placement upon the rigid metal plate prior to preheating therewith. The thermoplastic composition is preferably in pre-blanked form, i.e., cut to a specific desired size and/or configuration, due to the fact that a single article is stamped in the press with a rigid metal plate at a time. Blanks having different dimensions can be stacked prior to preheating to locate extra material where needed. This is particularly desirable when stamping complex or nonplanar parts. The stamping of the articles is considered noncontinuous in the sense that a predetermined amount of thermoplastic composition is placed on the rigid metal plate for stamping of each article; the stamping process is continuous, however, in the sence that several articles can be stamped in sequence through the use of a plurality of rigid metal plates. FIG. 1A shows the thermoplastic composition 11 in pre-blanked form supported on rigid metal plate 10, a plurality of blanks being stacked on plate 10, while FIG. 1B shows the thermoplastic compositon 11 in an aggregate cake or particle form supported on rigid metal plate 10.

Rigid metal plate 10 and thermoplastic composition 11 supported thereon are preferably heated as a unit to a temperature above the melting temperature of the thermoplastic compositon in, for instance, a radiant, dielectric, infrared, convection, conduction or vacuum oven. FIG. 2 shows pre-blanked thermoplastic composition 11 supported by rigid metal plate 10 in an open infrared oven 13 having (quartz) heating rods 12. During heating, and optionally during the subsequent transfer to the stamping press, rigid metal plate 10 can be supported by spaced rods, a flat surface, point supports, or held between clamping devices or other means of support. FIG. 2 shows, by way of example, rigid metal plate 10 supported by rack or grate 14 in oven 13. The support device contacts only rigid metal plate 10, leaving thermoplastic composition 11 and its local flow characteristics undisturbed. Further, the composition-contacting surface 15 of rigid metal plate 10 as shown does not contact rack or grate 14, and surface 15 should not be handled or manipulated by anything which would distort its special finish, and thus affect the surface quality of the to-be-stamped article.

Heating of the thermoplastic composition can occur inside of an injection molding machine or extruder barrel during formation of the composition rather than subsequent thereto. In such a case, the rigid metal plate would have to be preheated prior to depositing the already heated thermoplastic composition thereon, as the risk of degradation would be increased by depositing the heated thermoplastic composition onto a cool rigid metal plate and then heating the two as a unit. The separate preheating of the composition and rigid metal plate, while feasible, increases the risk of a temperature differential between the two. To minimize this risk and thereby increase control over the surface quality of the to-be-stamped article, the preferred embodiment contemplates the preheating of the composition and rigid metal plate as a unit.

The preheated thermoplastic composition 11 and rigid metal plate 10 are then transferred to a stamping press. FIG. 3A shows the open dies 16 and 17 of the stamping press with the thermoplastic composition 11 and plate 10 therebetween. Dies 16 and 17 are maintained at a lower temperature than the melting temperature of thermoplastic composition 11, preferaby ranging between a temperature of −10° C. and a temperature which is 30° C. less than the melting temperature of thermoplastic composition 11, so as to provide a cooling function while simultaneously imparting shape to the thermoplastic composition. The exact temperature of dies 16 and 17 is dependent on the polymer constituent of the thermoplastic composition and upon the desired stamping characteristics. Reference to FIG. 3A shows that rigid metal plate 10 is preshaped to fit the contour of die 16. Preheated rigid metal plate 10, which supports preheated thermoplastic composition 11, is placed on die 16, and the stamping press is closed (see FIG. 3B). The press remains closed until rigid metal plate 10 substantially cools and until thermoplastic composition 11 maintains its integrity and will no longer warp. Cooling occurs via conduction from the cooler die 16 through rigid metal plate 10 and from cooler die 17. Dies 16 and 17 are then opened, and rigid metal plate 10 and thermoplastic composition 11 are removed and separated (see FIG. 14). Thermoplastic composition 11, now a three-dimensional shaped object, is allowed to cool further, if necessary, and then transferred for further assembly or packaging. Rigid metal plate 10 is recycled for repeated use.

Rigid metal plate 10 has a thickness ranging from 0.020 to 0.100 inch and a Young's modulus ranging from $10 \times 10^6$ to $60 \times 10^6$ psi., the two characteristics being interdependent. More preferably, the thickness ranges from 0.040 to 0.060 inch and the Young's modulus ranges from $20 \times 20^6$ to $30 \times 10^6$ psi. As the plates are also formed in a stamping operation, very thick plates are difficult to make due to a tendency to fracture during the stamping stage of formation. If the metal plate is too thin, it will wrinkle during the preheat and/or stamping cycles of the present invention; this will cause surface imperfections in the stamped article and also make it exceedingly difficult to separate the metal plate from the stamped article which, in effect, will be interlocked. The metal plate should have a melting point which is significantly higher than that of the thermoplastic composition to be stamped, as the two are preheated above the melting point of the thermoplastic composition in the preheat stage. Thus, depending upon the thermoplastic composition to be stamped, the rigid metal plate may comprise a variety of metals or various alloys thereof, such as aluminum, chromium, tin, copper, lead, silver, gold, magnesium, low or medium carbon steel, nickel and the like.

The surface 15 of rigid metal plate 10 which contacts thermoplastic composition 11 has a special finish so that desired surface effects can be produced on a stamped article. When the end use dictates a smooth, imperfection-free surface, e.g., a stamped automotive exterior or appearance part, then surface 15 is preferably has a finish of from 1 to 8 microinches. When the end use dictates a frictional surface such as a matte surface, e.g., to provide a better grip for manual handling of the article, then surface 15 preferably has a finish of from 10 to 150 microinches. Special surface effects can be produced by finishing surface 15 with a screened pattern, grille pattern, etc. or combination of patterns. A wood-grain appearance can also be produced by utilizing the method comprising the present invention. With the present invention, it is also possible to stamp articles which differ only in their respective surface qualities while utilizing the same basic equipment. This is readily achieved by substitution of a metal plate having a different finish on surface 15.

When using an infrared oven (see FIG. 2) for preheating thermoplastic composition 11 and rigid metal plate 10, it is preferred that at least one surface 21 of the thermoplastic composition remain exposed to heating rods 12. If the thermoplastic composition has a rigid metal plate or plates blocking it from direct exposure to heating rods 12, preheating must occur via conduction through the rigid metal plate which is slower and less efficient. However, if steam heat or hot oil were to be used to preheat the thermoplastic composition and rigid metal plate, both primary surfaces of the thermoplastic could be blocked, as by an extra rigid metal plate. This plate can contact the heating surface for conductive heat exchange, not possible with radiant heating methods. In the situation where control of the surface quality for the entire to-be-stamped article is desired, it is preferable to preheat a second rigid metal plate separately and transfer it to the stamping press prior to stamping of the thermoplastic composition. Such a plate would have the same physical characteristics of the first plate, the second plate, however, being preshaped to fit the contour of the other die of the press and having the desired special finish on its composition-contacting surface.

Suitable thermoplastic resinous materials which may be utilized in making the composition of the present invention include, for example, the alkenyl aromatic resins typified by polystyrene, styrene copolymers, blends and graft copolymers of styrene and rubber and the like. The invention may be practiced utilizing polyvinylchloride or vinylidene chloride copolymers (sarans).

Particularly desirable thermoplastics in such compositions are the polyamides, that is, polymers having regularly recurring amide groups as an integral part of the main chain. Polyamides such as nylon 6,6 (a condensation product of hexamethylene diamine and adipic acid) and nylon-6 (the polymerization product of epsilon-aminocaproic acid or epsilon-caprolactam) are examples of two polyamides or nylons.

Polyolefins may also be employed, including polyethylene, polypropylene, polymethylpentene and copolymers thereof.

Additional polymers which can be utilized include polyurethane resins, polysulfone resins, polycarbonate resins and linear polyester resins such as polyethylene terephthalate and polybutylene terephthalate.

Also included in the term "polymer" are blends or copolymers of two or more polymeric materials. Illustrative of such polymers are polyethylene/polypropylene, polyethylene terephthalate/nylon-6, ethylene-acrylic acid-vinylacetate terpolymers and the like.

The polymer of choice may be reinforced with fibrous reinforcement, as for example, glass fibers, metal fibers, carbon fibers, sapphire or alumina whiskers, jute, hemp, sisal, or thermoplastic or thermosetting fibrous materials. The fibrous reinforcement may be in the form of chopped yarn, roving, scrim, woven cloth, woven roving, nonwoven mat, or the like.

The polymer of choice may also be reinforced with particulate filler. Suitable particulate fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polyamide. Examples of fillers included in these categories are alumina, aluminum hydrates, feldspar, talc, calcium carbonates, clay, carbon black, quartz, novaculite and other forms of silica, kaolinite, garnet, mica, saponite, beidellite, etc. The foregoing recited fillers are illustrative only and are not meant to limit the scope of fillers that can be utilized in this invention. Adhesion promoting agents or coupling agents may, of course, be utilized on the particulate filler phase.

In addition to a fiber reinforced thermoplastic and a particulate filler reinforced thermoplastic, the thermoplastic may be reinforced with a mixture of fiber and/or filler. Also, the fiber or fillers may be coated with sizing agents, coupling agents, adhesion promoters, wetting agents and the like, as are known to those skilled in the art.

The present invention is more particularly described in the following examples which are intended to be illustrative only since numerous modifications and variations therein will be apparent to those skilled in the art.

EXAMPLE 1

A sheet approximately 0.065 inch thick was formed which comprised 70 percent by weight nylon-6, 10 percent by weight kaolin clay of mean particle size 10 microns, 17.5 percent by weight short glass fibers (i.e., not exceeding about one inch in length), and 2.5 percent by weight glass veil. Two blanks, octagonal in shape and with a diagonal distance between opposed vertices of approximately 9 inches, were cut from the sheet and placed on top of one another. The two blanks were then placed on a flat 9-inch diameter circular low carbon steel plate which was approximately 0.050 inch thick and which had a Young's modulus of $30 \times 10^6$ psi. The thermal conductivity of the plate was 26 BTU/hour (foot$^2$) (° F. per foot). The surface of the plate on which the blanks were placed had a chrome finish of 6 microinches. This assembly (the two blanks on top of the steel plate) was placed on a grille in an infrared oven having quartz heating rods and heated until the entire assembly reached a temperature of about 371° C. (700° F.), which was above the melting temperature of the blanks. The assembly was transferred manually to a set of dies which were mounted in a hydraulic press and which were maintained at a temperature of 149° C. (300° F.), well below the melting temperature of the blanks. The surface of the die on which the assembly was placed was also flat. The heated blanks had a very fluid appearance. The blanks were quickly stamped into a disc under a pressure of 2400 psi for 10 seconds. The stamped disc and steel plate were removed from the press and separated from one another. The surface of the stamped disc which was in contact with the steel plate during preheating and stampoing exhibited excellent surface quality, i.e., it was extremely smooth with no evidence of warping, upon visual inspection.

EXAMPLE 2

A sheet approximately 0.070 inch thick was formed which comprised 70 percent by weight nylon-6, 10 percent by weight kaolin clay of mean particle size 10 microns, 17.5 percent by weight short glass fibers (i.e., not exceeding about one inch in length), and 2.5 percent by weight glass veil. Four rectangular blanks were cut from the sheet: One was four inches wide by eighteen inches long, and three were two inches wide by eighteen inches long. With reference to FIGS. 3A and 3B, the three narrower width blanks were stacked and placed to one side on the wider blank with their length dimensions in alignment. The four blanks were then placed on a preshaped rectangular steel plate 10 which was approximately 0.050 inch thick and which had a Young's modulus of $30 \times 10^6$ psi. The plate, which was four inches wide by eighteen inches long, was preshaped to curve convexly across its width. The thermal conductivity of the plate was 26 BTU/hour (foot$^2$) (° F. per foot). The surface of the plate on which the blanks were placed had a chrome finish of 6 microinches. This assembly (the four blanks 11 on top of the curved steel plate 10) was preheated and stamped under the conditions as set forth in Example 1. The surface of the die 16 on which the assembly was placed for stamping was shaped so that the curved metal plate 10 fit its contour. The upper die 17 was similarly shaped and had three parallel grooves 18 along its length which were above the four-blank-deep portion of the assembly during stamping. With reference to FIG. 4, the curved panel which was stamped was four inches wide by eighteen inches long. The surface of the stamped panel which was in contact with the steel plate during preheating and stamping exhibited excellent surface quality, i.e., it was extremely smooth with no evidence of warping upon visual inspection. On its other surface, the curved panel had three parallel ribs 19 along its length. Thus, it was possible to provide thermoplastic composition locally where required by design details of the to-be-stamped article.

EXAMPLE 3

The procedure of Example 1 is repeated, except that the surface of the plate on which the blanks are placed has a finish of about 80 microinches. The surface of the stamped disc which is in contact with the steel plate during preheating and stamping has a matte finish.

EXAMPLE 4

The procedure of Example 1 is repeated, except that the surface of the plate on which the blanks are placed is modified so as to produce a wood-grain finish on the surface of the stamped disc which is in contact with the steel plate during preheating and stamping.

EXAMPLE 5

The procedure of Example 1 is repeated, except that the surface of the plate on which the blanks are placed has a chrome finish of about 6 microinches on one half thereof and a finish of about 80 microinches on the other half thereof. The surface of the stamped disc which is in contact with the steel plate during preheating and stamping has a smooth finish on one half and a matte finish on the other half.

We claim:

1. In a method of processing a discrete thermoplastic composition into shaped articles in which said composition is preheated, subsequently transferred to a set of dies and stamped into a three-dimensional shaped object in a rapid stamping cycle, the improvement comprising:
   (a) placing said composition on a contoured rigid plate, the surface of said plate contacting said composition having a special finish, said plate being preshaped to fit the contour of the cavity of one of said dies;
   (b) preheating both said composition and said plate to a temperature greater than the melting temperature of said composition;
   (c) maintaining a set of dies at a temperature lower than said melting temperature of said composition;
   (d) transferring said composition and said plate to said set of dies, said plate being placed into the cavity of said die to which said plate has been contoured;
   (e) pressing said composition and said plate between said set of dies until said plate has substantially cooled and until said composition maintains its integrity and will no longer warp;
   (f) removing said composition and said plate from said set of dies.

2. The method of claim 1 wherein said composition and said plate are preheated concurrently.

3. The method of claim 1 wherein said composition is placed on said plate subsequent to their separate preheating.

4. The method of claim 1 wherein said composition is processed in pre-blanked, sheet form.

5. The method of claim 1 in which said surface of said plate contacting said composition has a finish of from 1 to 8 microinches.

6. The method of claim 1 in which said surface of said plate contacting said composition has a finish of from 10 to 150 microinches.

7. The method of claim 1 in which said surface of said plate contacting said composition is modified so as to produce a wood-grain finish on said composition.

8. The method of claim 1 in which said surface of said plate contacting said composition has varying finishes thereacross.

9. The method of claim 1 in which said composition and said plate are preheated to a temperature of at least 210° C.

10. The method of claim 1 in which said set of dies is maintained at a temperature ranging between $-10°$ C. and a temperature which is 30° C. less than said melting temperature of said composition.

11. The method of claim 1 wherein said plate has a thickness ranging from 0.020 to 0.100 inch, a Young's modulus ranging from $10 \times 10^6$ to $60 \times 10^6$ psi, and a thermal conductivity ranging from 8 to 240 BTU/hour (foot$^2$) (° F. per foot).

12. The method of claim 11 wherein said plate is metal and has a thickness ranging from 0.040 to 0.060 inch and a Young's modulus ranging from $20 \times 10^6$ to $30 \times 10^6$ psi.

* * * * *